US010361983B2

(12) United States Patent
Archer et al.

(10) Patent No.: US 10,361,983 B2
(45) Date of Patent: Jul. 23, 2019

(54) MESSAGE QUEUE MANAGER (71) Applicant: INTERNATIONAL BUSINESS MACHINES CORPORATION, Armonk, NY (US)

(72) Inventors: Adam G. Archer, Toronto (CA); Herman S. Badwal, Markham (CA); Robin Y. Bobbitt, Raleigh, NC (US); Christopher M. Lee-Shanok, Torono (CA); Robert Retchless, Toronto (CA); Lauren H. Schaefer, Newark, DE (US); Christopher N. Taylor, Newmarket (CA)

(73) Assignee: International Business Machines Corporation, Armonk, NY (US)

( * ) Notice: Subject to any disclaimer, the term of this patent is extended or adjusted under 35 U.S.C. 154(b) by 95 days.

(21) Appl. No.: 15/468,664

(22) Filed: Mar. 24, 2017

(65) Prior Publication Data
US 2018/0278567 A1 Sep. 27, 2018

(51) Int. Cl.
H04L 12/24 (2006.01)
H04L 12/26 (2006.01)
(Continued)

(52) U.S. Cl.
CPC .......... H04L 51/26 (2013.01); H04L 41/5019 (2013.01); H04L 43/16 (2013.01);
(Continued)

(58) Field of Classification Search
CPC .. G06F 19/3468; G06F 19/00; G06F 19/3418; G06F 11/3419; G06F 11/3452;
(Continued)

(56) References Cited

U.S. PATENT DOCUMENTS 8,484,060 B2   7/2013   D'Andrea et al.
8,555,281 B1   10/2013  Van Dijk et al.
(Continued)

FOREIGN PATENT DOCUMENTS

EP          2553889 B1      1/2016
WO     WO2009014455 A1     1/2009
(Continued)

OTHER PUBLICATIONS

Peter Mell et al, The NIST Definition of Cloud Computing, National Institute of Standards and Technology, Publication 800-145, 2011.
(Continued)

Primary Examiner — Djenane M Bayard
(74) Attorney, Agent, or Firm — Patrick J. Daugherty; Daugherty & Del Zoppo Co., LPA (57) ABSTRACT Aspects provide message queue management as a function of processing time estimation, wherein a processor stores a message directed to a user from a messaging server in a distraction queue, and predicts a processing time required by the user to process the received message as a function of sender identity or of an identified message topic or type. The processor increments a processing time counter value for the distraction queue with the predicted processing time of the message, and notifies the user of the received message and all other messages currently saved to the distraction queue in response to determining that the incremented processing time counter value meets a threshold value.

20 Claims, 5 Drawing Sheets (51) Int. Cl.
*H04L 12/58* (2006.01)
*H04L 12/863* (2013.01)
(52) U.S. Cl.
CPC .............. *H04L 47/62* (2013.01); *H04L 51/24* (2013.01); *H04L 51/34* (2013.01)
(58) Field of Classification Search
CPC .. G06F 11/3495; G06F 11/2294; G06F 11/27; G06F 17/30368; G06F 17/5022; G06F 1/10; G06F 1/12; G06F 2217/62; H04L 67/325; H04L 43/0864; H04L 47/2458; H04L 29/06; H04L 51/14; H04L 51/18; H04L 51/20; H04L 51/26; H04L 51/34; H04L 67/2819; H04L 67/2823; H04L 67/306; H04L 69/14; H04L 69/329; H04L 47/10; H04L 47/26; H04L 47/27; H04L 49/506; H04L 12/2898; H04L 12/403
See application file for complete search history.

(56) References Cited

U.S. PATENT DOCUMENTS

| | | | |
|---|---|---|---|
| 2008/0056225 A1* | 3/2008 | Brok ........................ | H04L 47/14 370/342 |
| 2009/0055502 A1* | 2/2009 | Agarwal .............. | G06Q 10/107 709/207 |
| 2009/0119062 A1 | 5/2009 | Owens et al. | |
| 2012/0150964 A1* | 6/2012 | Gourevitch .......... | G06Q 10/107 709/206 |
| 2013/0304826 A1* | 11/2013 | Li .......................... | H04L 51/14 709/206 |
| 2014/0089235 A1 | 3/2014 | Lynar et al. | |
| 2015/0039703 A1* | 2/2015 | Kursun ................... | H04L 51/26 709/206 |
| 2017/0026328 A1* | 1/2017 | Adkins .................. | H04L 51/12 |

FOREIGN PATENT DOCUMENTS

| | | |
|---|---|---|
| WO | WO2011141624 A1 | 11/2011 |
| WO | WO2012036709 A1 | 3/2012 |
| WO | WO2015065383 A1 | 5/2015 |

OTHER PUBLICATIONS

Howtogeek, How to Manage Interruptions and Downtime in Android 5.0, http://www.howtogeek.com/203716/howtomanageinterruptionsand-downtimeinandroid5.0, 2014.
Syavash Nobarany et al, Interruption Management in Web-based Collaborative Systems, Brian Fisher—academia.edu, http://www.academia.edu/2976853/Interruption_Management_in_Webbased_Collaborative_Systems, 2016.
Rescue Time, Find your ideal work-life balance, Time management software for staying productive and happy, https://www.rescuetime.com, 2016.
Chrometa, "Passive" Timekeeping—It's Easy & 100% Accurate, Time Tracking Software for Mac, PC, iPhone, Android, http://www.chrometa.com, 2016.

* cited by examiner

MESSAGE QUEUE MANAGER

BACKGROUND

Users of electronic messaging platforms have access to wide variety of communication channels that may each present streams of individual messages on a continual basis. Examples of the channels, messages and/or associated message content include email, mailing lists, instant messaging, discussion forums, chat applications, work item notifications, phone calls, meeting requests, invitations to personal or team events, personal communications, customer issues, services outages, etc.

Reading, comprehending or otherwise processing such individual messages often require attention by the user that interferes with or distracts the user from a task that the user is currently focused upon, sometimes referred to as a "context switch." Context switches triggered by message interruption may be costly with respect to worker productivity: for example, it may take a software developer five to ten minutes, or more, to get into the same state of mind of coding as they were in before the interruption occurred. Interruptions occurring throughout a given day that result in significant amounts of context shift may require corresponding amounts of productivity time, resulting in the developer failing to complete a scheduled or expected amount of coding over a given workday, and wherein the developer may end up working late at night, or on weekends when there are less distractions, in order to timely process a given workload.

For example, consider a developer "Chris" with a large work load, including responsibility for a high priority narrative for a new cloud architecture service that Chris's team is developing. However, throughout the day people constantly distract Chris, either through instant messaging, email, or queries from discussion forums (for example, to determine what libraries Chris is currently using, the current state of the older architecture, if Chris is free to meet for coffee on the weekend, etc.). As a result, Chris ends up getting insufficient work done in the office during the work day, and ends up continuing to work at home well beyond the office hours, making for a poor work-life balance.

SUMMARY

In one aspect of the present invention, a computerized method for message queue management as a function of processing time estimation includes executing steps on a computer processor. Thus, a computer processor stores a message directed to a user from a messaging server in a distraction queue, and predicts a processing time required by the user to process the received message as a function of sender identity or of an identified message topic or type. The processor increments a processing time counter value for the distraction queue with the predicted processing time of the message, and notifies the user of the received message and all other messages currently saved to the distraction queue in response to determining that the incremented processing time counter value meets a threshold value.

In another aspect, a system has a hardware processor in circuit communication with a computer readable memory and a computer-readable storage medium having program instructions stored thereon. The processor executes the program instructions stored on the computer-readable storage medium via the computer readable memory and thereby stores a message directed to a user from a messaging server in a distraction queue, and predicts a processing time required by the user to process the received message as a function of sender identity or of an identified message topic or type. The processor increments a processing time counter value for the distraction queue with the predicted processing time of the message, and notifies the user of the received message and all other messages currently saved to the distraction queue in response to determining that the incremented processing time counter value meets a threshold value.

In another aspect, a computer program product for message queue management as a function of processing time estimation has a computer-readable storage medium with computer readable program code embodied therewith. The computer readable hardware medium is not a transitory signal per se. The computer readable program code includes instructions for execution which cause the processor to store a message directed to a user from a messaging server in a distraction queue, and predict a processing time required by the user to process the received message as a function of sender identity or of an identified message topic or type. The processor is further caused to increment a processing time counter value for the distraction queue with the predicted processing time of the message, and notify the user of the received message and all other messages currently saved to the distraction queue in response to determining that the incremented processing time counter value meets a threshold value.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
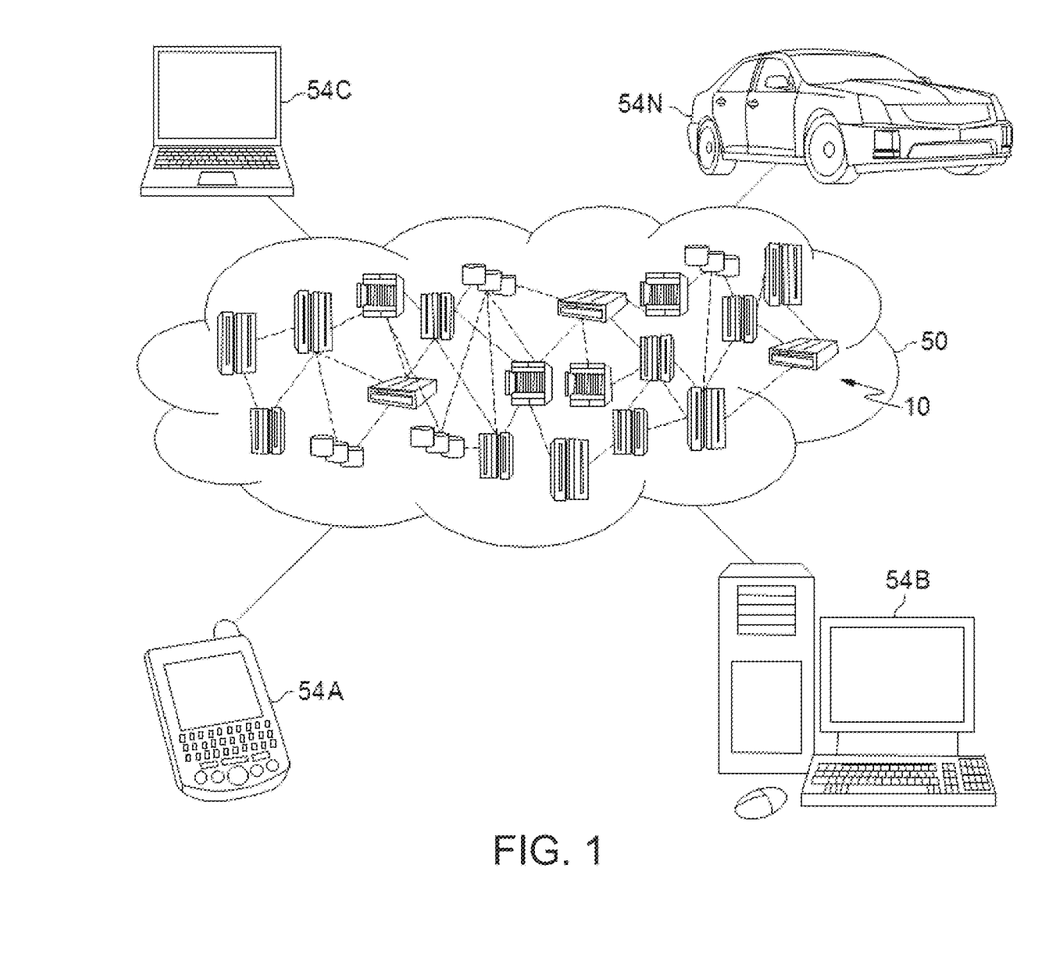
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
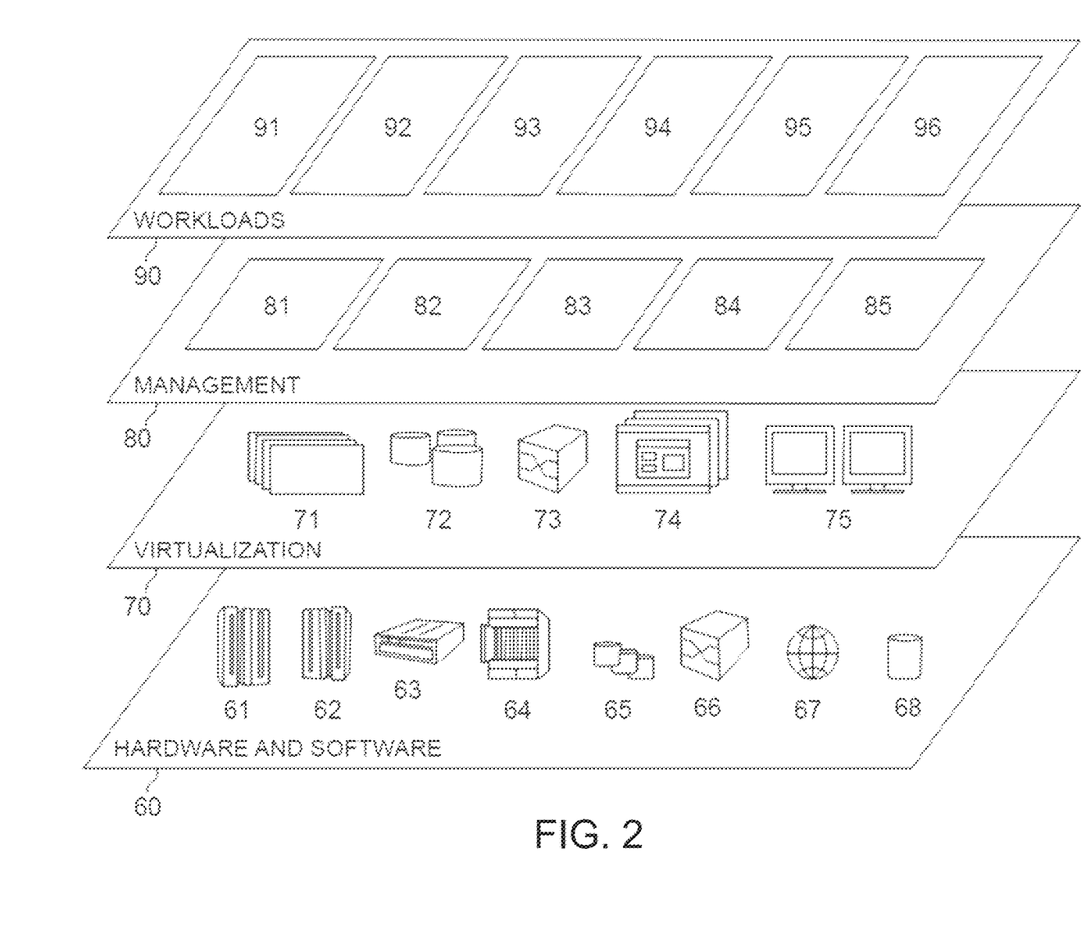
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing for multi-tier data synchronization based on a concurrent linked monitor list 96.

Figure 3:
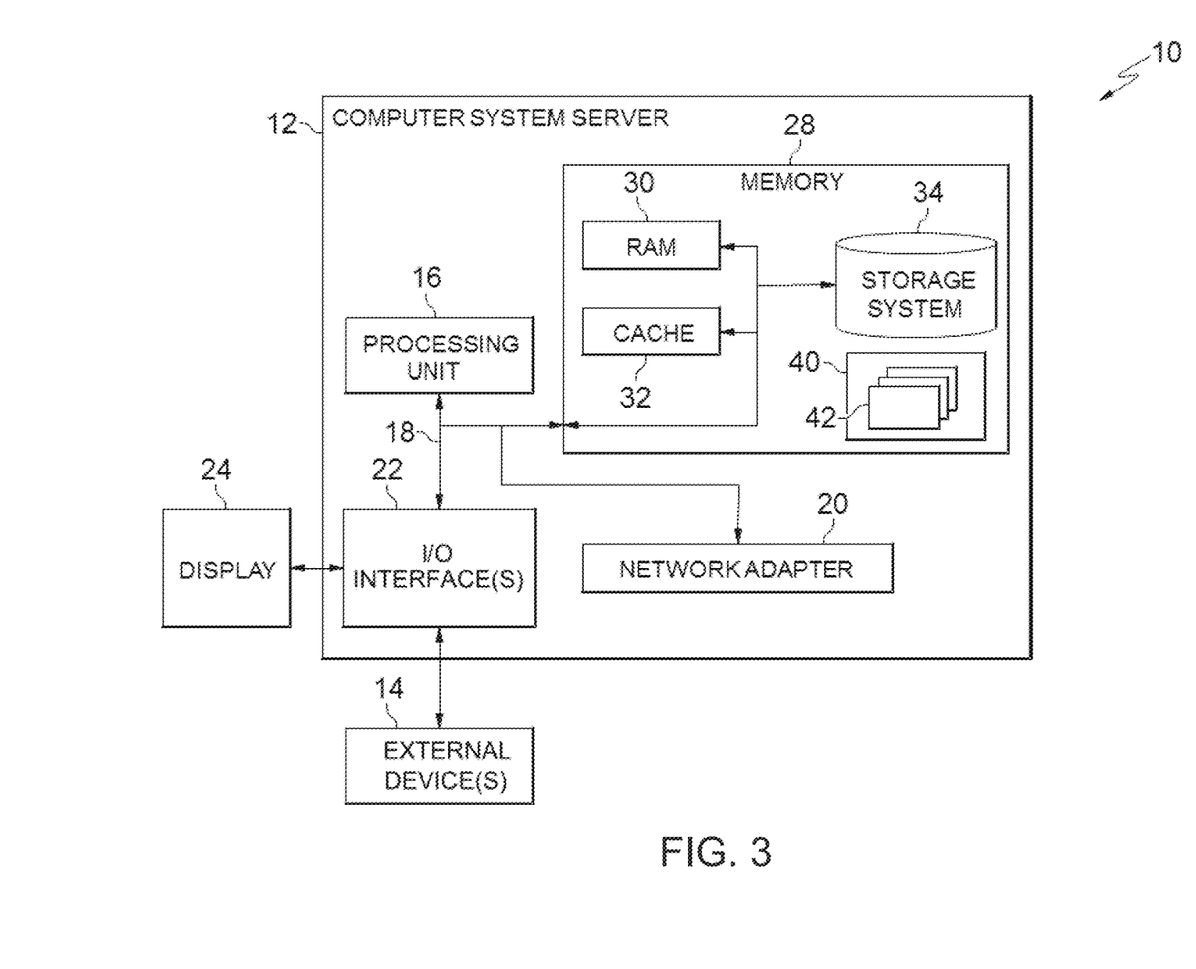
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
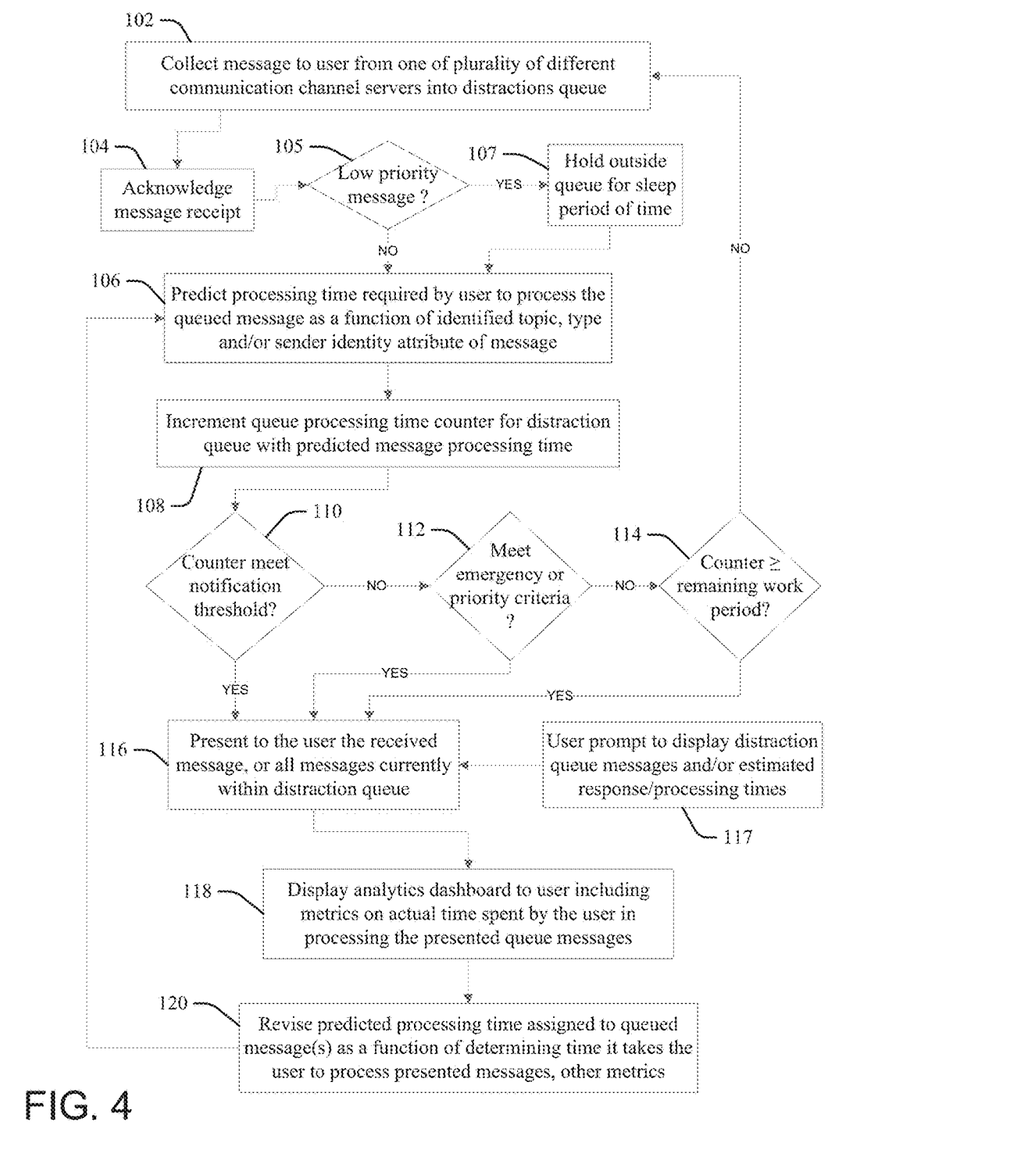
FIG. 4 is a flow chart illustration of an embodiment of the present invention.

FIG. 4 illustrates a process or system according to the present invention for message queue management as a function of processing time estimation. At 102 a processor that is configured according to an aspect of the present invention (the "configured processor") functions as a "central communication hub" for a user and receives and collects a message (incoming text, audio or video content item, notification, alert, alarm, etc.) to the user from one of a plurality of different communication channel servers (or applications) in communication with the hub (email and instant meeting requests and service queries from messaging servers, posting or reply alerts from discussion forum servers, calendar and task item notifications from productivity and scheduling applications, incoming phone calls from personal telephones, etc.) into a notification or distractions queue. The configured processor may be implemented in accordance with the computer system server 10 of FIG. 3, including as the cloud node 10 of FIG. 1, as described respectively above.

The message collected and queued at 102 is not conveyed to the user per usual mechanisms associated with the notification (ring tone, alert sounds, pop-up banner notifications displayed within a graphic user device display of a smart phone or computer of the user, etc.), in order to prevent the notification from distracting the user from any task they are currently focused upon. Thus, notifications and messages are sometimes herein referred to as "distractions." The configured processor instead acts to receive the messages in place of the user, and thereby suppress associated distractions to a user who would otherwise directly receive the notifications and stop what the user is currently doing to process the content of the notifications, perhaps to respond accordingly.

In some aspects, at 104 the configured processor optionally provides automatic acknowledgment to a sender of receipt of the message at 102: for example generating and sending email receipts to the sender of an email, triggering a voice mail application to answer a phone call, sending an acknowledgement statement in reply to text, IM and chat messages (for example, "Hi, this is Chris, I received your message but cannot reply at this time, I'll get back to you as soon as I can"), etc.

Some queued notifications need not be processed immediately. Thus, in an optional process of some aspects of the present invention, the configured processor determines at 105 whether the collected message is a low priority notification, and if so holds the low priority notification outside of the distractions queue for a sleep period of time. At the end (lapse) of the sleep period the configured processor adds the held, low-priority notification back into the distraction queue, for processing and consideration.

At 106 the configured processor determines (predicts) a processing time required by the user to process the received message queued in the distraction queue (at the end of the sleep period if determined at 105 that it was a low priority message) as a function of an identified topic, type and/or sender identity attribute of the message. For example, in response to determining that the notification is a text message regarding a specific team project from team member "A", the configured processor determines at 106 that historic user data indicates that the user (or other users sharing some demographic data with the user) takes an average of five minutes to read and respond to series of messages that arise on this topic and/or project and/or project type and/or that originate from sender "A," and accordingly assigns five minutes as processing time for the user for the notification at 102.

At 108 the configured processor increments a processing time counter for the distraction queue with the processing time determined for the message at 106, and at 110 compares the incremented queue processing time counter value to a notification threshold time specified for the user. Aspects of the present invention may also automatically remove message distractions from the queue at 110, and correspondingly reduce the incremented counter value by the amount added in previously for the removed message, in response to determining that an issue forming a basis of the message has been resolved. This may be indicated by natural language processing of text content within a subsequent, related message that is explicitly or implicitly indicative that the issue is resolved and now moot. For example, a subsequent, second message is received from a same person under a same subject line as a queued first message, wherein the later, second message includes the text content phrase "never mind, I figured it out," may be recognized by the configured processor as cancelling the first message. Machine learning processes at 106 and 120 may continually process notifications and associated resolutions or responses by the user, wherein the configured processors learn to recognize messages that require no action. If the system is unsure whether a message requires processing by the user, it may prompt the user to ask if the message had any value when it is marked complete.

If the counter timer threshold is not met at 110, at 112 the configured processor determines wherein the notification meets an emergency or priority criteria (as a function of topic, sender flags, sender identity, origin, type, number of repeated receipts (including via different notification servers) within a repetition threshold time, etc.).

If determined that the notification does not meet the emergency or priority criteria, then in an optional process of some aspects of the present invention, at 114 the configured processor determines whether the time value of the incremented queue processing time counter is equal to or greater than an amount of time currently remaining in a specified work day of the user or a period thereof (for example, time left until a lunch hour break). If not, the configured processor returns to 102 to listen for a next notification, and to continually, dynamically compare the time value of the incremented queue processing time counter to total time remaining in the user workday or period thereof. Via using the optional process of 114 a user is enabled to specify that the configured processor notify them of the notification currently within the queue, so that they may process and complete all their distractions before scheduled meetings (calendar based thresholds), or before certain times of the day, including the end of a workday (designated time thresholds). Thus, the invention enables a user to get everything that has been shunted to the queue processed and done by the end of the day, and wherein the user is also up to date before attending any scheduled meetings.

Thus, in response to determining that the incremented queue processing time counter meets the threshold at 110, that the notification meets an emergency or priority criteria at 112, or that the time value of the incremented queue processing time counter is equal to or greater than an amount of time remaining in a specified work period at 114, at 116 the configured processor drives a graphical user interface (GUI) display device to display, or otherwise notifies, the user of the message received at 102, and (unless triggered by the determination at 112 that the message meets emergency or priority criteria) all of the other messages currently queued (via respective previous iterations at 102) since a last time that the incremented queue counter met the threshold at 110. More particularly, in notifying the user at 116 in response to determining at 112 that the message meets emergency or priority criteria, the configured processor may present notification of only the message received at 102 (for example, in response to determining its unique status as meeting the emergency or priority criteria relative to the other messages currently queued); or the configured processor may present all of the messages currently within the queue, enabling the user to quickly review and dispose of all of said messages when the emergency or priority criteria arise. The configured processor may execute either of these options in response to a policy choice, preference or selection of the user or service provider.

Generally, when based on the counter value criteria at 112 or 114, the notification display at 116 is a list or batch of notifications that each require predicted processing times that equal, or exceed, the threshold times applied at 112 or 116 when considered in aggregate. The distraction threshold time applied at 110 may be specified by the user (for example, "notify me when total predicted processing for queued messages reaches 30 minutes"), or it may be automatically determined, for example as an average of historic message processing time data, or historically preferred or optimal times for batch message processing for the user based on user identity, demographics, job title, etc.

The configured processor may present the queued notifications at 116 in compliance with user or service provider preferences or specifications, including in response to learning preferential ordering. For example, the configured processor may sort or rank the queued notifications from highest priority to lowest priority, including as interpreted or learned from historical preferences of the user or service provider. The configured processor may also present the notifications in groupings based on or learned from user or service provider preferences, such as in response to commonalities or differences sender identity (team members, family member, social network friends, internal or external organization status, etc.).

Aspects also enable a user to manually open a communication hub client to look at (display) the current distraction queue list, and/or the times estimated for the user to process/respond to the distractions therein, in response to a user prompt to the configured processor at 117. Thus, the user is able to decide to start working on their distractions queue at any time, (for example, upon returning to their desk or opening up their laptop, a tablet application, etc.), wherein the user determines that the time is appropriate for him or her to start viewing and processing the queued messages, independent of the state of the counter value or emergency/priority status of a received message or notification associated therewith.

At 118, the configured processor drives a GUI display device to display an analytics dashboard to the user that comprises metrics on actual time spent by the user in processing the queue messages presented at 116; aspects may also present other metrics relevant to time and resources expended by the user during the workday, etc.

At 120, in a feedback mechanism the configured processor automatically revises (adjusts, refines, improves, etc.) the processing times assigned to queued messages (at 106), as a function of determining how long it actually takes the user to process the listed items, and/or of the metrics displayed at 118. Processing time determinations at 120 may include machine learning systems and components, and comprehend interpreting manual inputs from the user marking a processed notification as started or completed, and automatic determinations generated by tracking how long the user takes to reply and move on from a particular notification, for example wherein the configured processor itself is used to automatically generate and send a reply.

Processing times determined for a given queued message at 120 may be based on immediate actions that fall short of fully processing a message item, such as triaging the item (assigning a priority flag or value for use in ranking a message relative to other messages for future, full processing), or marking it "read," rather than completing work involved with the notification. Accordingly, aspects of the present invention may capture or otherwise assign the shorter times for such immediate actions in incrementing the queue timer at 108, instead of incrementing the timer by the full, anticipated processing time of a given item or task. This determination may be predicted or fully automated, such as in response to indications in historic data or in user preferences that specify that incoming emails from certain senders on certain topics are always ranked for future processing, rather than fully processed.

Aspects of the present inventions track the time required by users to process and respond to the queued messages at 120 in order to get back to working on other tasks, which may or may not have been affected by messages received. Any "immediate" processing work (for example, replying, creating a work item to track a work item that is the subject of a message within the distraction queue for later processing, granting access to a system that someone has requested, etc.) may be tracked by the configured processor and included in predicted "distraction times" allocated for a particular message for use in incrementing the queue counter value at 108 in response to adding the message to the queue at 102.

Implementation may include a user or service provider installing a "communication collector" on the devices that they carry (for example, an application from their smartphone's "app store," and another associated application for their work laptop). Thus, a communication collector app may guide the user through configurations and preference settings in order to enable aspects of the present invention to collect notifications from any communication applications installed on the device, and to suppress notifications and send replies through the corresponding servers.

In some implementations, the user configures one or more of the communication collector apps to be a "communication hub" from which they can respond to all of their distractions, and have such devices notify them when their specified threshold for "distraction time" is met.

Accurate time estimation may be improved by observing how long it takes a user to perform tasks associated with the notifications. Aspects of the present invention may include two different phases or processing steps: a training period and an active period, wherein during the training period the configured processor is active but does not suppress notifications. Instead, the configured processor in training mode measures and records the times taken by the user to respond to the queued distractions, and stores this data along with metadata on the distractions (for example, name of the person who sent a message, length of the message, the number of people it was sent to, what time it was sent vs the current time, etc.). Once enough information (a threshold amount) is gathered to satisfy a probabilistic model, the configured processor then transitions from training to an active mode, where the configured processor suppresses notifications on all devices until the queue time counter threshold is met (at 110, FIG. 4). During the active period or mode, the configured processor may also continually monitor and record the time taken by the user to perform tasks, and use this data to refine and continually improve task estimation times.

Some aspects may provide an analytics dashboard that is viewable by the user on demand, wherein the user may get metrics on where their distraction time is being spent. Thus, the user is enabled to quickly observe which tasks and notifications take the most time, or most frequently demand processing time, etc., and refine his or her preferences for enqueueing such item in the future to optimize time spent in processing the queued distractions.

Figure 5:
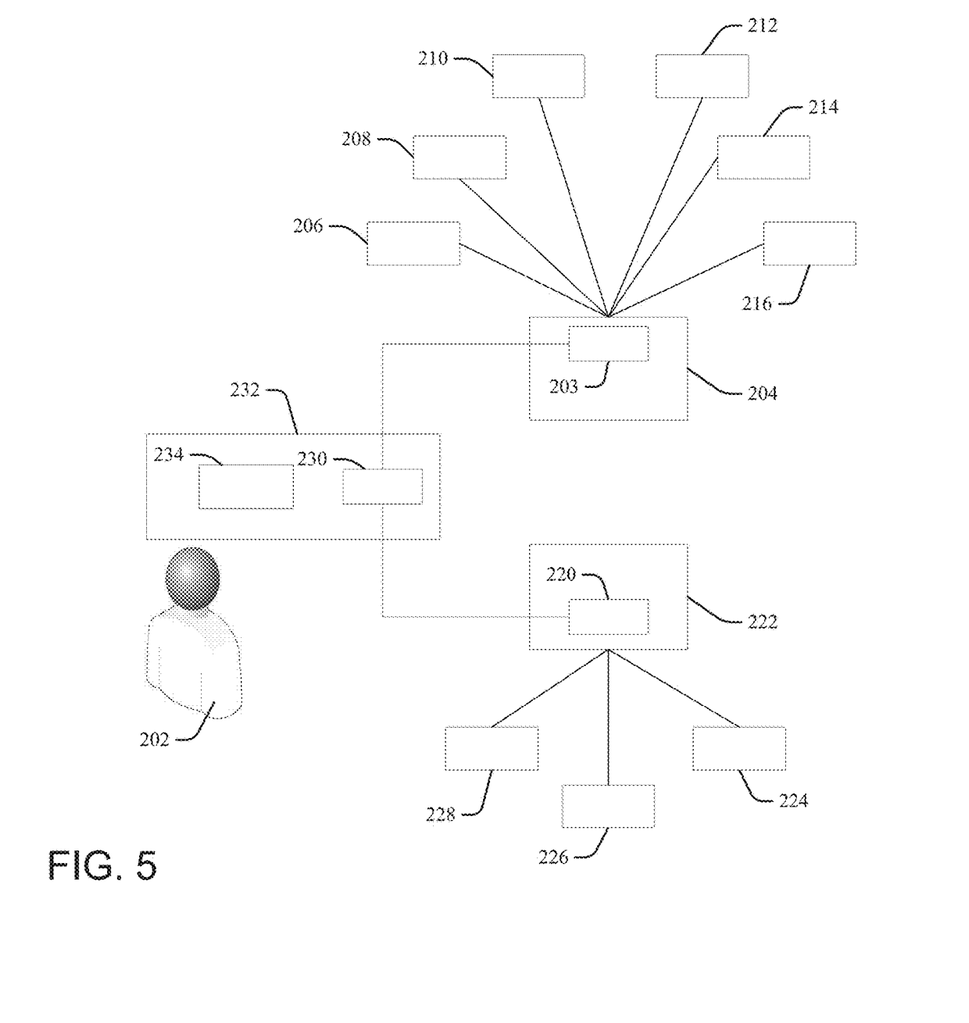
FIG. 5 is a block diagram illustration of an embodiment of the present invention.

FIG. 5 illustrates one example implementation of an aspect of the present invention, wherein a user 202 opens a first "communication collector" application 203 according to the present invention (executing a processor configured as described above) on his smart phone 204 to collect messages directed (addressed) to the user 202 from each of from a plurality of different servers or devices in communication with the phone 204, including: text messages from a cellular carrier server 206, and from another messaging server 208 of a native application executing on the phone 204; an incoming video call request from a video chat service server 210; a banner notification request from a social media service server 212, a chat message from another, chat service server 214, and an email notification from another, third party email server 216.

The user 202 also opens (installs, executes, etc.) another, second communication "communication collector" application 220 according to the present invention (executing a configured processor as described above) on his work laptop 222 and configures it to connect to and receive messages directed (addressed) to the user 202 from each of another set of different messaging, chat or notification servers 224, 226 and 228. The user connects both of the collectors 203 and 220 to a "communication hub" account application 230 of the user hosted by a work laptop 232 of the user, to thereby manage into a distraction queue administered by the hub account application 230 all of the messages, notifications and other distractions received by the first communication collector 203 from the servers 206, 208, 210, 212, 214 and 216, and by the second communication collector 220 from the servers 224, 226 and 228, pursuant to the process and system of FIG. 4 described above, between the hours of 8:30 AM to 5:00 PM on weekdays.

In the present example the user 202 specifies a threshold for the counter value of the distraction queue of 45 minutes, and starts working on a weekday morning, and isn't interrupted by the communication client (the communication collector hub 230) until 1:00 PM, wherein the queue timer has incremented to a value meeting the 45-minute threshold (as determined at 110, FIG. 4), after the user 202 has completed a number of tasks (fixed two product defects, finished a task for a feature, had lunch with his or her team, etc.), wherein the communication collector hub 230 causes a graphic user interface (GUI) display 234 of the laptop 232 to present a list of the messages within the distraction queue (at 116, FIG. 4).

The communication collector hub 230 determines that the user spends about one hour on processing the presented list of distractions, rather than the estimated/expected 45 minutes, and updates processing time metrics appropriately (at 120, FIG. 4) to be more accurate for the next iteration of gathering a batch of messages into the distraction queue.

At 3:00 PM, the user 202 gets a single notification from the communication hub 230 from a specific "technical lead" sender, wherein the communication hub 230 sends the message directly to the user 202 in response to determining (at 112, FIG. 4) that the notification meets a priority criteria set by the user 202 for the sender that causes the notification to bypass the queue process, allowing the technical lead to get an immediate response from the user 202 without delays associated with shunting into the distraction queue.

The user then gets pulled into a production issue which has caused a problem on a website. The user 202 fixes the problem by 4:00 PM, wherein the communication hub application 230 determines (at 114, FIG. 4) that the incremented counter time for the distraction queue has a value of 30 minutes (reflecting a prediction that processing the messages currently in the queue will require 30 minutes of the user's time), and that the user has only 30 available minutes remaining in the workday ending at 5:00 PM (accounting for a 30-minute meeting scheduled at 4:30 PM). Accordingly, the communication collector hub 230 notifies the user 202 that he or she has about 30 minutes to process a current queue list of distraction messages that are anticipated (predicted) to require 30 minutes of processing time by the user 202, and causes the laptop 232 GUI display 234 to present said current list of the messages (at 116, FIG. 4).

The user 202 responsively attends to the list of messages in the queue, finishes up the processing within the allotted (predicted) 30 minutes, and thereby attends the meeting from 4:30 to 5:00 PM. The user 202 is thereby enabled to leave work at the end of the meeting, right on time at 5:00 PM with all tasks and queue distractions handled, resulting in an increase of satisfaction of the user 202 with his or her workload and work-life balance.

Thus, aspects of the present invention provide advantages over prior art time management techniques by efficiently distributing message-related tasks to users in discrete batches, resulting in fewer interruptions to the work flow of the user relative to interrupting the user to attend to each message individually, which results in wasted time through causing lost time associated with executing more cognitive shifts throughout the workflow of the day.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims, and as illustrated in the figures, may be distinguished, or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations, or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising executing on a computer processor the steps of:
   in response to receiving a message directed to a user from a messaging server from a sender, storing the message in a distraction queue;
   determining a processing time required by the user to process the received message as an average of historic data times required by the user to read and respond to text content within each of a plurality of different messages from the sender that each have topic text content in common with a text content topic of the received message;

incrementing a processing time counter value for the distraction queue with the determined processing time of the message; and in response to determining that the incremented processing time counter value meets a notification threshold value, notifying the user of the received message and all other messages currently saved to the distraction queue.

2. The method of claim 1, further comprising:

in response to determining that the incremented processing time counter value does not meet the notification threshold value, and is equal to or greater than an amount of time currently remaining in a specified work day period of the user, notifying the user of the received message and all other messages currently saved to the distraction queue.

3. The method of claim 1, for example, notifying the user of the received message in response to determining that the received message meets an emergency or priority criteria.

4. The method of claim 1, further comprising:

in response to determining that the received message is a low priority notification, holding the low priority notification outside of the distractions queue for a sleep period of time; and at a lapse of the sleep period, adding the held low priority notification back into the distraction queue, and responsively performing the steps of determining the processing time required by the user to process the added message and incrementing the processing time counter value for the distraction queue with the determined processing time of the added message.

5. The method of claim 1, further comprising:

integrating computer-readable program code into a computer system comprising a processor, a computer readable memory in circuit communication with the processor, and a computer readable storage medium in circuit communication with the processor; and wherein the processor executes program code instructions stored on the computer-readable storage medium via the computer readable memory and thereby performs the steps of storing the message in the distraction queue in response to receiving the message directed to the user, determining the processing time required by the user to process the received message, incrementing the processing time counter value for the distraction queue with the determined processing time of the message, and notifying the user of the received message and all other messages currently saved to the distraction queue in response to determining that the incremented processing time counter value meets the notification threshold value.

6. The method of claim 5, wherein the computer-readable program code is provided as a service in a cloud environment.

7. The method of claim 1, further comprising:

in response to determining that an issue forming a basis of the received message has been resolved, removing the received message from the distraction queue and reducing the incremented counter value by an amount added in previously for the removed message.

8. The method of claim 7, further comprising:

determining that the issue forming the basis of the received message has been resolved as a function of determining that text content within a second message that is received subsequent to receipt of the received message is indicative that the issue is resolved.

9. The method of claim 1, wherein the step of notifying the user of the received message and all other messages currently saved to the distraction queue comprises driving a graphical user interface display to present a list of messages comprising the received message and all other messages currently saved to the distraction queue.

10. The method of claim 9, further comprising:

presenting the list of messages in a preferential ordering that is learned from user preferences, wherein the ordering is selected from a group consisting of a ranking from a highest priority to a lowest priority, and groupings based on commonalities or differences in sender identity.

11. The method of claim 9, further comprising:

driving the graphical user interface display to present an analytics dashboard to the user that comprises metrics on actual time spent by the user in processing the messages saved to the distraction queue.

12. The method of claim 11, further comprising:

determining an amount of time taken by the user to read and respond to text content of the received message presented within the list of messages; and revising the determined processing time required by the user to process the received message as a function of the determined amount of time taken by the user to read and respond to the text content of the received message presented within the list of messages.

13. The method of claim 12, wherein the step of determining the amount of time taken by the user to process the received message presented within the list of messages is selected from the group consisting of:

interpreting a manual input from the user marking the presented received message; and tracking how long the user takes to reply to the presented received message and move on to begin processing another message presented within the list of messages.

14. A system, comprising:

a processor;

a computer readable memory in circuit communication with the processor; and a computer readable storage medium in circuit communication with the processor;

wherein the processor executes program instructions stored on the computer-readable storage medium via the computer readable memory and thereby:

in response to receiving a message directed to a user from a messaging server, stores the message in a distraction queue;

determines a processing time required by the user to process the received message as an average of historic data times required by the user to read and respond to text content within each of a plurality of different messages from the sender that each have topic text content in common with a text content topic of the received message;

increments a processing time counter value for the distraction queue with the determined processing time of the message; and in response to determining that the incremented processing time counter value meets a notification threshold value, notifies the user of the received message and all other messages currently saved to the distraction queue.

15. The system of claim 14, wherein the processor executes the program instructions stored on the computer-readable storage medium via the computer readable memory and thereby further:

in response to determining that the incremented processing time counter value does not meet the notification threshold value, and is equal to or greater than an amount of time currently remaining in a specified work day period of the user, notifies the user of the received message and all other messages currently saved to the distraction queue.

16. The system of claim 14, wherein the processor executes the program instructions stored on the computer-readable storage medium via the computer readable memory and thereby further:

in response to determining that received message is a low priority notification, holds the low priority notification outside of the distractions queue for a sleep period of time; and at a lapse of the sleep period, adds the held low priority notification back into the distraction queue, and responsively determines the processing time required by the user to process the added message and increments the processing time counter value for the distraction queue with the determined processing time of the added message.

17. The system of claim 14, wherein the processor executes the program instructions stored on the computer-readable storage medium via the computer readable memory and thereby further:

in response to determining that an issue forming a basis of the received message has been resolved, removes the received message from the distraction queue and reduces the incremented counter value by an amount added in previously for the removed message.

18. A computer program product for message queue management as a function of processing time estimation, the computer program product comprising:

a computer readable storage medium having computer readable program code embodied therewith, wherein the computer readable storage medium is not a transitory signal per se, the computer readable program code comprising instructions for execution by a processor that cause the processor to:

in response to receiving a message directed to a user from a messaging server, store the message in a distraction queue;

determine a processing time required by the user to process the received message as an average of historic data times required by the user to read and respond to text content within each of a plurality of different messages from the sender that each have topic text content in common with a text content topic of the received message;

increment a processing time counter value for the distraction queue with the determined processing time of the message; and in response to determining that the incremented processing time counter value meets a notification threshold value, notify the user of the received message and all other messages currently saved to the distraction queue.

19. The computer program product of claim 18, wherein the computer readable program code instructions for execution by the processor further cause the processor to, in response to determining that the incremented processing time counter value does not meet the notification threshold value, and is equal to or greater than an amount of time currently remaining in a specified work day period of the user, notify the user of the received message and all other messages currently saved to the distraction queue.

20. The computer program product of claim 18, wherein the computer readable program code instructions for execution by the processor further cause the processor to:

in response to determining that the received message is a low priority notification, hold the low priority notification outside of the distractions queue for a sleep period of time; and at a lapse of the sleep period, add the held low priority notification back into the distraction queue, and responsively determine the processing time required by the user to process the added message, and increment the processing time counter value for the distraction queue with the determined processing time of the added message.

* * * * *